United States Patent [19]

Carlson

[11] Patent Number: 4,833,896

[45] Date of Patent: May 30, 1989

[54] DISPOSABLE EVAPORATIVE COOLER PAD ASSEMBLY

[76] Inventor: Rene C. Carlson, 2437 S. Saddleback, Tucson, Ariz. 85710

[21] Appl. No.: 155,495

[22] Filed: Feb. 12, 1988

[51] Int. Cl.⁴ ............................................. F28D 5/00
[52] U.S. Cl. ....................................... 62/304; 261/94; 261/DIG. 41
[58] Field of Search ............... 261/94, 95, 152, 154, 261/97, 29, DIG. 41; 62/304, 309, 310, 305

[56] References Cited

U.S. PATENT DOCUMENTS 3,756,138  9/1973  Box .................................... 98/40 X
4,045,523  8/1977  Goettl ................................. 261/97
4,419,300 12/1983  Van Ness et al. ..................... 62/304

*Primary Examiner*—Henry A. Bennet
*Attorney, Agent, or Firm*—Victor Flores; Harry M. Weiss

[57] ABSTRACT

A disposable cooler pad apparatus and method for use in evaporative cooler units requiring yearly maintenance to maintain maximum cooling performance. The apparatus consists of an integrally molded frame assembly having a least one STYROFOAM panel having a plurality of angled louvers and a wood fiber, or the like, evaporative cooler pad lining positioned adjacent each other and between outer and inner frame members. The molded evaporative cooler pad apparatus is designed to be a replacement assembly for the cooler pad assemblies factory provided on evaporative cooler units. The low cost nature of the design and manufacture of the integrally molded cooler pad apparatus renders the entire apparatus disposable at time of maintenance.

13 Claims, 3 Drawing Sheets

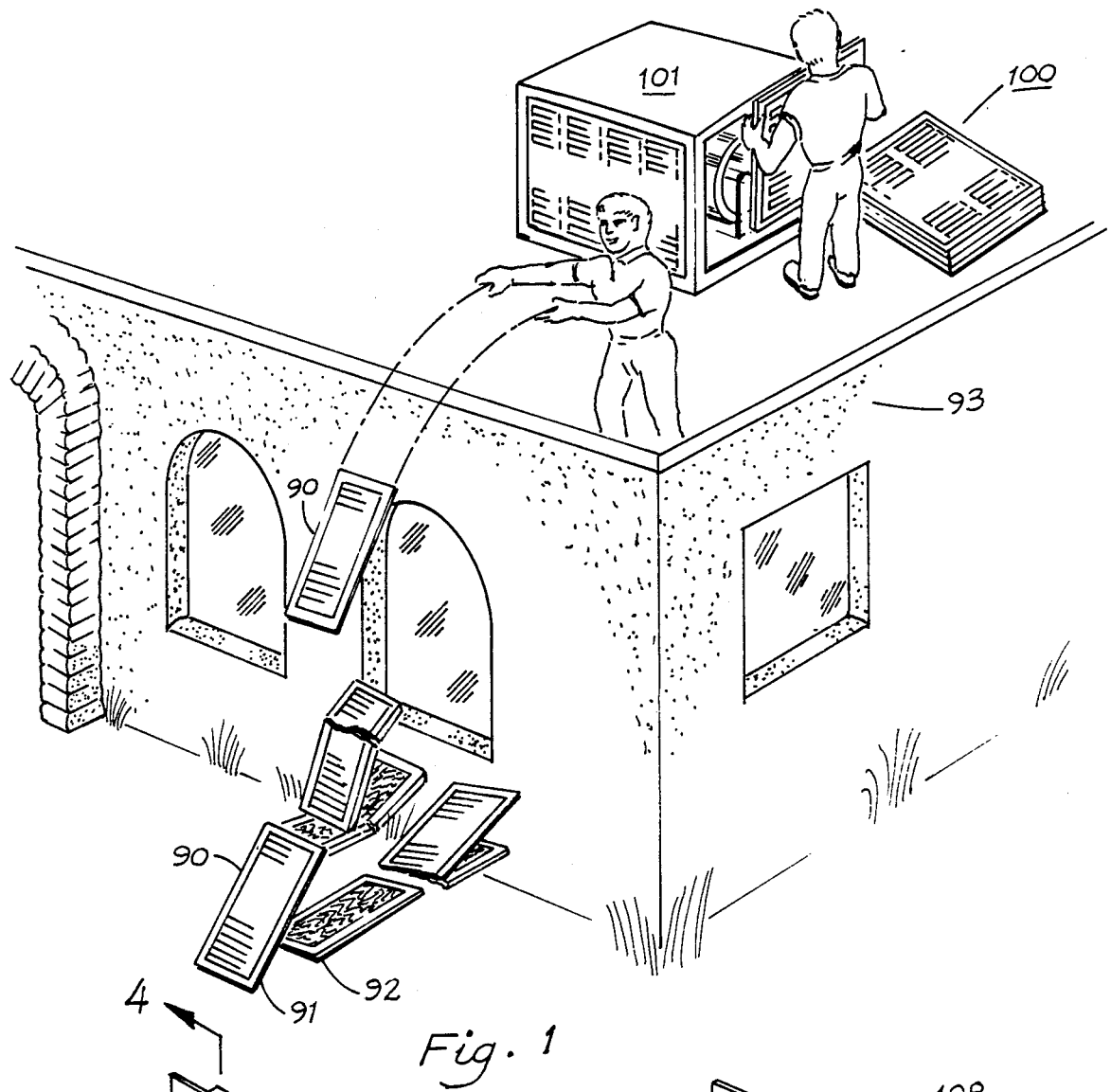
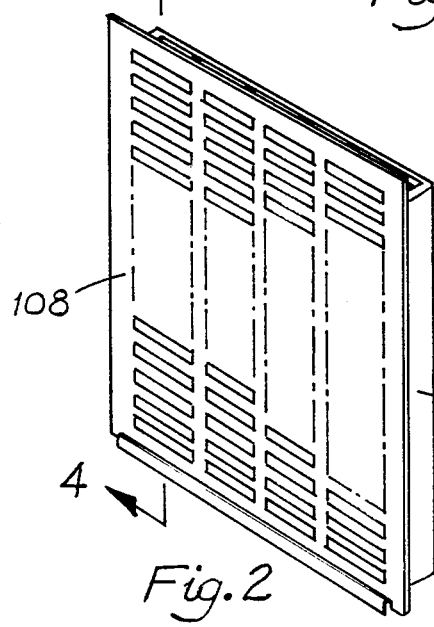
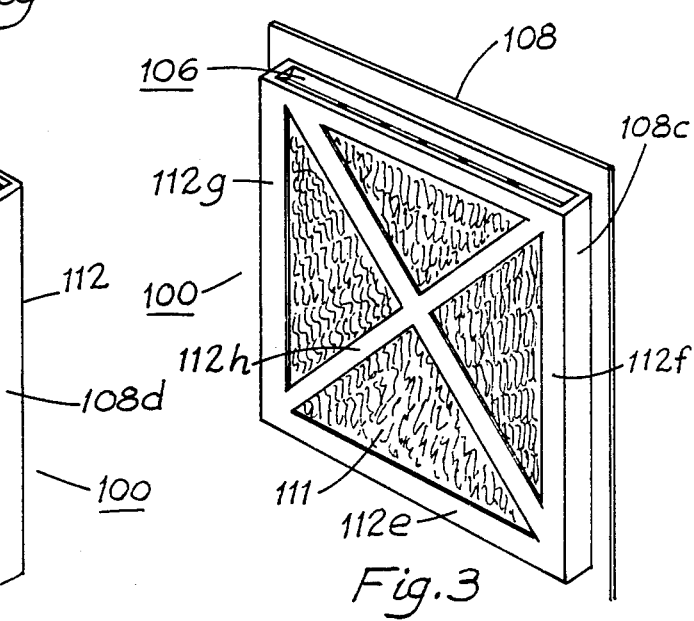

DISPOSABLE EVAPORATIVE COOLER PAD ASSEMBLY

FIELD OF THE INVENTION

The present invention generally relates to cooler pad assemblies used in evaporative cooler units and more particularly, is concerned with apparatus relating to an integrally assembled and disposable cooler pad assembly and method of using same on evaporative coolers units having framed cooler pad assemblies requiring periodic maintenance to assure maximum cooling performance.

DESCRIPTION OF THE PRIOR ART

Evaporative cooler units derive their cooling capacity from the cooling of air by the evaporation of water. Evaporative coolers generally have pads over which water flows and through which air is passed to be cooled. Pads are usually manufactured from fibrous material such as aspen wood. The pads are mounted in a permanent frame, usually fabricated from metal, for attachment to the cooler.

The frames generally consist of a rectangular metal rim with exterior metal louvers to allow only passage of air. The pad is placed in the frame and secured by metal retaining strips attached to the rim by screws or other equivalent methods.

Evaporative coolers must be thoroughly and regularly cleaned to remove salts, biological matter, and other materials left by the evaporating water. Normally, the wood fibrous evaporative cooler pad is removed from the frame and replaced, while the frame must be cleaned for reuse. However, the salts and other materials are also responsible for substantial corrosion of the metal frames, louvers, retaining strips, and screws. As a result, the cleaning is time-consuming, messy, and often results in damaged frames and lost frame pieces. The cleaning is a task required but despised by homeowners and maintenance workers.

One method of providing integrally molded plastic louver assemblies is described and illustrated in U.S. Pat. No. 3,756,138 to Box. Integrally molded plastic frames containing arcuate louvers are assembled using integrally molded guide means to create a rigid framework which is chemically resistant, easily disassembled for cleaning, and more economical than the conventional metal louver panels. However, these louver panels are not lightweight or disposable.

Consequently, there is a need for an economical and disposable louver, frame, and pad assembly for evaporative coolers to eliminate the need for much of the seasonal cleaning and replacement of the cooler parts. There is a need for a unitized frame and pad assembly to eliminate the need for seasonal disassembly and reassembly of the cooler parts. Further, there is a need for a lightweight assembly to facilitate installation in evaporative coolers, many of which are roof-mounted.

Therefore, a primary objective of the present invention is to provide a cooler pad assembly which can be economically manufactured to render the assembly disposable and which will be a direct replacement for factory provided cooler pad assemblies that require piecemeal rework to rejuvenate to a level of performance that will maximize the cooling efficiency of an evaporative cooler unit.

Another object of the invention is to provide a replacement cooler pad assembly for periodic maintenance of evaporative cooler units having the apparatus of the present invention installed and in need of periodic maintenance.

SUMMARY OF THE INVENTION

The present invention provides an integrally assembled disposable cooler pad apparatus for replacement of factory provided framed cooler pad assemblies on evaporative cooler units or for replacement of the apparatus of the present invention once in use and in need of periodic maintenance. The apparatus consisting of a frame having an outer and an inner frame members, at least one louvered panel containing a plurality of apertures slanted at an angle (or, preferably an outer louvered panel having apertures slanted at a first angle and an inner louvered panel having apertures slanted at a second angle), a wood fibrous evaporative cooler pad and a water trough. The components of the cooler pad assembly are enclosed within the inner and outer frame members to form a integrally framed cooler pad assembly which will allow direct on-site replacement of the corroded framed cooler pad assemblies on cooler units. The inner and outer frame members and water trough are preferably formed of plastic, the inner and outer lovered panels are preferably formed of an expanded synthetic resinous ematerial such as STYROFOAM, and the evaporative cooler pad is formed of conventional materials such as aspen wood fibers. The apparatus provides a lightweight assembly and due to the inexpensive method of fabrication also provides an economical assembly which may be rendered disposable.

Therefore, to the accomplishments of the foregoing objects, the invention consists of the foregoing features hereinafter fully described and particularly pointed out in the claims, the accompanying drawings and following disclosure describing in detail the invention, such drawings and disclosure illustrating, however, but one of the various ways in which the invention may be practiced.

BRIEF DESCRIPTION OF THE DRAWINGS

FIG. 1 is a perspective view of a building having a roof-mounted evaporative cooler unit and showing generally the removal and disposal of the corroded framed cooler pads and installation of the disposable integrally framed cooler pad assembly of the present invention.

FIG. 2 is a perspective view of the outer face of the integrally framed cooler pad assembly of the present invention.

FIG. 3 is a perspective view of the inner face of the integrally framed cooler pad assembly of the present invention.

DESCRIPTION OF THE PREFERRED EMBODIMENT

Figure 6:
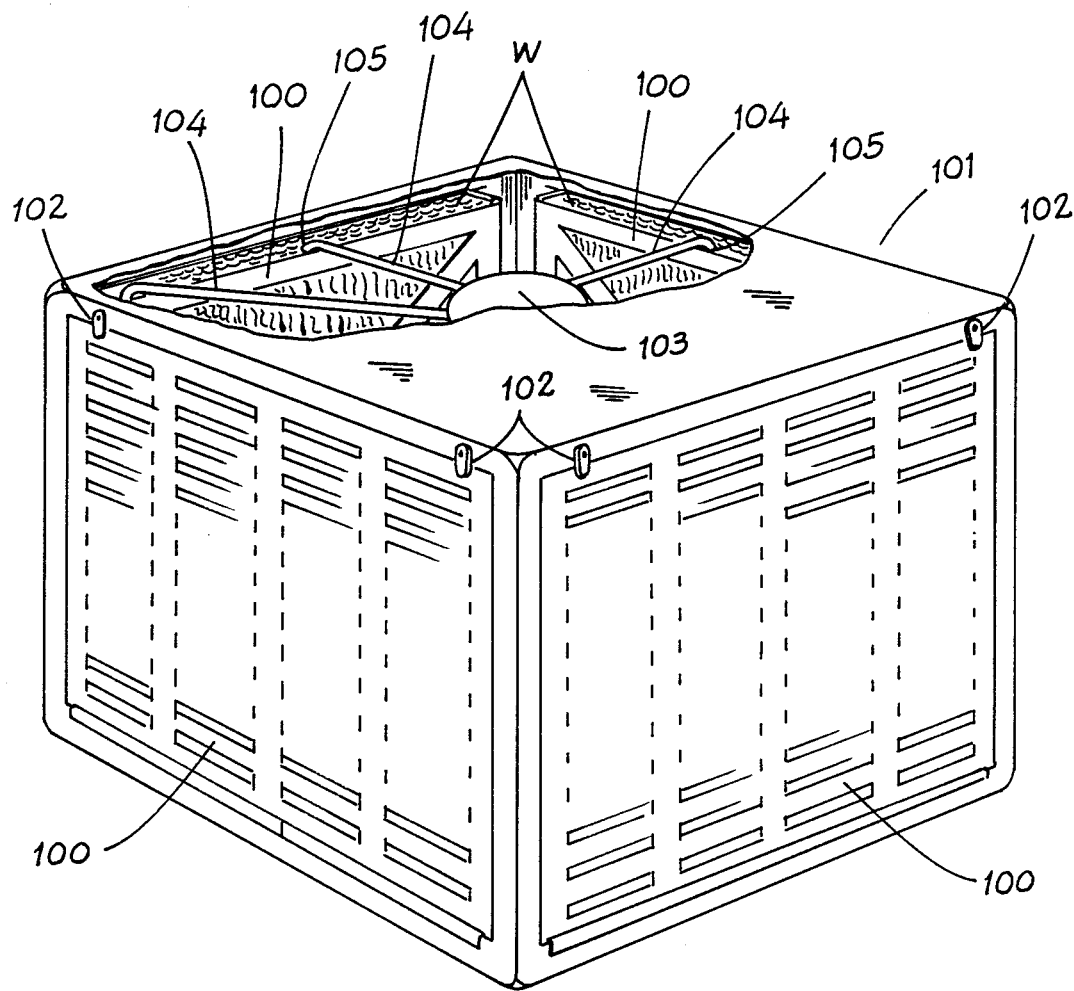
FIG. 6 is a perspective view of an evaporative cooler unit showing the installed cooler pad assemblies of the present invention using existing latching mechanism and a cutaway showing the water distribution system of the cooling system delivering water to the water trough.

Referring now to the Figures, there is shown in FIG. 1 a building, generally designated 93, having roof-mounted evaporative cooler unit, generally designated 101. Used framed cooler pad assemblies, generally designated 90 and composed of frame 91 and cooler pad 92, are shown disposably removed from evaporative cooler unit 101. New disposable framed cooler pad assemblies 100 of the present invention are shown being installed on evaporative cooler 101. As is best seen by referring to FIG. 6, evaporative cooler 101 can be quickly refurbished by installing disposable cooler pad assemblies 100 and securing using existing latch means 102 and support flange 108i provided on the assembly 100. The apparatus of the present invention 100 is intended to function in an equivalent manner as factory provided framed cooler pad 90 or a corroded and used cooler pad 100. Evaporative cooler unit 101 contains water distribution system 103 and water feeder tubes 104 having drip ends 105 and directing water w to the water troughs 106 provided on disposable cooler pad assemblies 100.

Referring now to FIGS. 2, 3, 4 and 5 where it is shown that disposable cooler pad assembly 100 is constructed having outer frame member 108 including a left side and a right side vertical outer retaining flanges 108g and 108h, an upper horizontal outer retaining flange 108f integrally molded with an upper portion of said left side and right side vertical outer retaining flanges 108g and 108h, a lower horizontal outer retaining flange 108e integrally molded with a lower portion of said left side and right side vertical outer retaining flanges 108f and 108g, a left side and right side rearwardly protruding flanges 108c and 108d integrally molded respectively with said left side and right side vertical outer retaining flanges 108f and 108g, a rearwardly protruding bottom flange 108b integrally molded with said lower horizontal retaining flange 108e and with said left side and right side rearwardly protruding flanges 108c and 108d, a rearwardly protruding top flange 108a integrally molded with said upper horizontal outer retaining flange 108f and a horizontal support flange 108i integrally molded to said lower horizontal outer retaining flange 108e.

FIG. 3 shows an inner face of disposable cooler pad assembly 100 having outer frame 108, inner frame member 112, cooler pad 111, and water trough 106. Inner frame member is shown to include, a left side and a right side vertical inner retaining flanges 112f and 112g, respectively, an upper horizontal inner retaining flange 112a integrally molded with an upper portion of said left side and right side vertical inner retaining flanges 112f and 112g, a lower horizontal inner retaining flange 112e integrally molded with said left side and right side vertical inner retaining flanges 112f and 112g, a left side and a right side outwardly protruding inner side flanges 112c and 112d, respectively, integrally molded respectively with said left side and right side vertical inner retaining flanges 112f and 112g, an inner outwardly protruding bottom flange 112b integrally molded with said horizontal inner retaining flanges 112f and 112g and with said left and right side outwardly protruding inner side flanges 112c and 112d and cross support retaining flanges 112h integrally molded with said left and right side vertical retaining flanges 112f and 112g, said lower horizontal inner retaining flange 112e, and with said upper horizontal inner retaining flange 112a.

Figure 4:
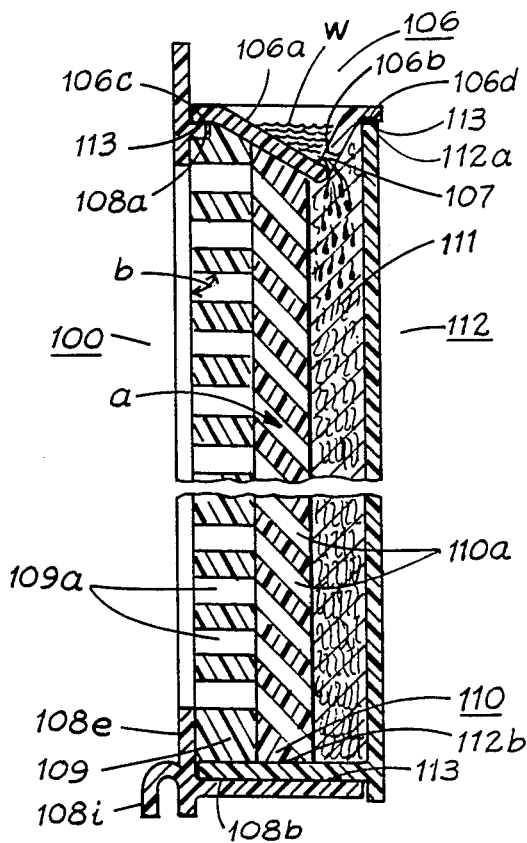
FIG. 4 is a cross-sectional view of the framed cooler pad assembly taken along line 4—4 of FIG. 2 showing a typical enclosed assembly arrangement of the outer frame member, an outer louvered panel, an inner louvered panel, wood fibrous evaporative cooler pad, a water trough mounted above and an inner frame member of the present invention.

FIG. 4 shows in cross section outer frame 108 having top flange 108a (for supporting water trough 106), bottom flange 108b, outer louver panel 109 having aperture 109a having a slanted angled opening at an angle b, shown as 90 degrees, inner louver panel 110 also having apertures 110a having a slanted angled opening shown as negative 45 degrees with respect to a vertical surface of the louvered panel, cooler pad 111, inner frame 112 having upper edge 112a (for supporting water trough 106) and lower inner outwardly protruding flange 112b, and water trough 106. Water trough 106 has outer angled portion 106a, inner angled portion 106b, outer support portion 106c, and inner support portion 106d. Outer frame 108, inner frame 112, and water trough 106 are preferably assembled and fixedly attached by adhesive 113, shown generally in FIG. 4 bonding 108b to 112b, 108a to 106c, 106d to 112a and in FIG. 5 adhesive 113 applied to outward protruding flange 112d for bonding 112d to 108d. Water ports 107 in water trough 106 pass water w to cooler pad 111. Air is circulated in direction of arrow a through louvers 109a and 110a and through cooler pad 111.

Figure 5:
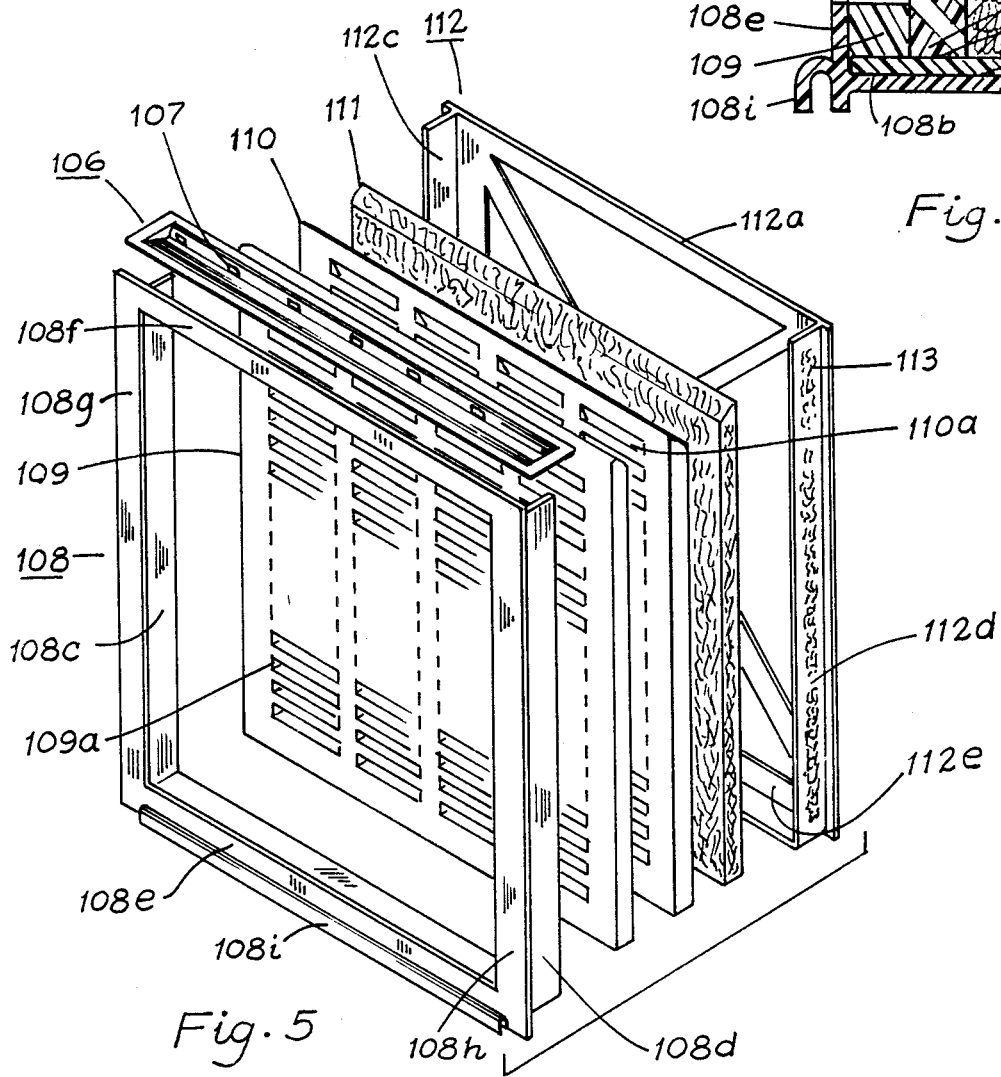
FIG. 5 is an exploded perspective view of the present invention showing a typical manufacturing assembly of the parts using an adhesive to form an integral disposable structure.

FIG. 5 shows an exploded view of the preferred embodiment with outer frame member 108 having outer louvered panel 109 installed adjacent outer frame member 108, inner louvered panel 110 installed adjacent outer panel 109 and wood fibrous evaporative cooler pad 111 being installed adjacent inner louvered panel 110 and inner frame member 112. Water trough 106 having water ports 107 is shown installed above panels 109 and 110 and above cooler pad 111.

In actual production it is expected that inner and outer frame members 108 and 112 as well as water trough 106 will be fabricated using molded plastic manufacturing means while inner and outer louvered panels 109 and 110 will be of an expanded synthetic resinous material commercially known as STYROFOAM. The assembly process is shown as utilizing an adhesive to bond the various parts, however other equivalent design may produce the same end product.

Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparatus.

I claim:

1. An integrally assembled disposable cooler pad apparatus for replacement of factory provided cooler pad assemblies on evaporative cooler units, said apparatus comprising:
   (a) an outer frame member, said outer frame member being sized to fit in a space provided for said factory provided cooler pad assemblies on said evaporative cooler units, said outer frame member having:
      (i) a left side and a right side vertical outer retaining flange,
      (ii) an upper horizontal outer retaining flange integrally molded with an upper portion of said left side and right side vertical outer retaining flange, (iii) a lower horizontal outer retaining flange integrally molded with a lower portion of said left side and right side vertical outer retaining flange, (iv) a left side and right side rearwardly protruding flanges integrally molded respectively with said left side and right side vertical outer retaining flange, (v) a rearwardly protruding bottom flange integrally molded with said lower horizontal retaining flange and with said left side and right side rearwardly protruding flanges, (vi) a rearwardly protruding top flange integrally molded with said upper horizontal outer retaining flange, and (vii) a horizontal support flange integrally molded to said lower horizontal outer retaining flange;

(b) at least one louvered panel means for assembling adjacent said outer frame member, said at least one louvered panel means having a plurality of apertures slanted at an angle with respect to a vertical surface of said at least one louvered panel, said at least one louvered panel being fabricated from an expanded synthetic resinous material and being an integral disposable element of said apparatus;

(c) a wood fibrous evaporative cooler pad assembled adjacent said at least one louvered panel means;

(d) a water trough, said water trough being assembled to said outer frame member, and being positioned above said at least one louvered panel means and said evaporative cooler pad; and (e) an inner frame member, said inner frame member being assembled adjacent said evaporative cooler pad and provided with means for integrally enclosing said evaporative cooler pad, said at least one louvered panel means and said water trough to said outer frame member to form said disposable cooler pad apparatus.

2. An integrally assembled disposable cooler pad apparatus for replacement of factory provided cooler pad assemblies on evaporative cooler units, said apparatus comprising:

(a) an outer frame member, said outer frame member being sized to fit in a space provided for said factory provided cooler pad assemblies on said evaporative cooler units;

(b) at least one louvered panel means for assembling adjacent said outer frame member, said at least one louvered panel means having a plurality of apertures slanted at an angle with respect to a vertical surface of said at least one louvered panel, said at least one louvered panel being fabricated from an expanded synthetic resinous material and being an integral disposable element of said apparatus;

(c) a wood fibrous evaporative cooler pad assembled adjacent said at least one louvered panel means;

(d) a water trough, said water trough being assembled to said outer frame member, and being positioned above said at least one louvered panel means and said evaporative cooler pad; and (e) an inner frame member, said inner frame member being assembled adjacent said evaporative cooler pad and provided with means for integrally enclosing said evaporative cooler pad, said at least one louvered panel means and said water trough to said outer frame member to form said disposable cooler pad apparatus, said inner frame member having:

(i) a left side and a right side vertical inner retaining flange;

(ii) an upper horizontal inner retaining flange integrally molded with an upper portion of said left side and right side vertical inner retaining flange, (iii) a lower horizontal inner retaining flange integrally molded with said left side and right side vertical inner retaining flanges, (iv) a left side and a right side outwardly protruding inner side flanges integrally molded respectively with said left side and right side vertical inner retaining flanges, (v) an inner outwardly protruding bottom flange integrally molded with said horizontal inner retaining flange and with said left and right side outwardly protruding inner side flanges, and (vi) cross support retaining flange integrally molded with said left and right side vertical retaining flanges, said lower horizontal inner retaining flange, and with said upper horizontal inner retaining flange.

3. An integrally assembled disposable cooler pad apparatus for replacement of factory provided cooler pad assemblies on evaporative cooler units, said apparatus comprising:

(a) an outer frame member, said outer frame member being sized to fit in a space provided for said factory provided cooler pad assemblies on said evaporative cooler units;

(b) at least one louvered panel means for assembling adjacent said outer frame member, said at least one louvered panel means having a plurality of apertures slanted at an angle with respect to a vertical surface of said at least one louvered panel, said at least one louvered panel being fabricated from an expanded synthetic resinous material and being an integral disposable element of said apparatus, said at least one louvered panel means comprising:

(i) an outer louvered panel and
(ii) an inner louvered panel;

(c) a wood fibrous evaporative cooler pad assembled adjacent said at least one louvered panel means;

(d) a water trough, said water trough being assembled to said outer frame member, and being positioned above said at least one louvered panel means and said evaporative cooler pad; and (e) an inner frame member, said inner frame member being assembled adjacent said evaporative cooler pad and provided with means for integrally enclosing said evaporative cooler pad, said at least one louvered panel means and said water trough to said outer frame member to form said disposable cooler pad apparatus.

4. An integrally assembled disposable cooler pad apparatus as recited in claim 3, wherein:

(a) said outer louvered panel further includes a plurality of apertures slanted at a first angle with respect to a vertical surface of said outer louvered panel, said outer louvered panel being fabricated from an expanded synthetic resinous material;

(b) said inner louvered panel further includes a plurality of apertures slanted at a second angle with respect to a vertical surface of said inner louvered panel, said inner louvered panel being fabricated from an expanded synthetic resinous material.

5. An integrally assembled disposable cooler pad apparatus as recited in claim 4, wherein:

said inner and outer louvered panels are fabricated from STYROFOAM.

6. An integrally assembled disposable cooler pad apparatus as recited in claim 4, wherein:
said first angle is 90 degrees; and
said second angle is negative 45 degrees.

7. An integrally assembled disposable cooler pad apparatus as recited in claim 1, wherein said inner frame member includes:
(a) a left side and a right side vertical inner retaining flanges;
(b) an upper horizontal inner retaining flange integrally molded with an upper portion of said left side and right side vertical inner retaining flanges;
(c) a lower horizontal inner retaining flange integrally molded with said left side and right side vertical inner retaining flanges;
(d) a left side and a right side outwardly protruding inner side flanges integrally molded respectively with said left side and right side vertical inner retaining flanges;
(e) an inner outwardly protruding bottom flange integrally molded with said horizontal inner retaining flange and with said left and right side outwardly protruding inner side flanges; and
(f) cross support retaining flanges integrally molded with said left and right side vertical retaining flanges, said lower horizontal inner retaining flange, and with said upper horizontal inner retaining flange.

8. An integrally assembled disposable cooler pad apparatus as recited in claim 7, wherein:
(a) said water trough comprises,
(i) a substantially horizontal v-shaped channel and
(ii) water ports integrally formed within said horizontal v-shaped channel; and
(b) said at least one louvered panel means further comprises,
(i) an outer louvered panel and
(ii) an inner louvered panel.

9. An integrally assembled disposable cooler pad apparatus as recited in claim 8, wherein:
(a) said outer louvered panel further comprises, a plurality of apertures slanted at a first angle with respect to a vertical surface of said outer louvered panel, said outer louvered panel being fabricated from an expanded synthetic resinous material; and
(b) said inner louvered panel further comprises a plurality of apertures slanted at a second angle with respect to a vertical surface of said inner louvered panel, said inner louvered panel being fabricated from an expanded synthetic resinous material.

10. An integrally assembled disposable cooler pad apparatus as recited in claim 9, wherein:
said first angle is 90 degrees;
said second angle is negative 45 degrees; and
said inner and outer louvered panels are fabricated from STYROFOAM.

11. An integrally assembled disposable cooler pad apparatus as recited in claim 10, wherein:
said outer frame member, said inner frame member and said water trough are fabricated from a molded plastic; and
said outer frame member, said inner frame member and said water trough enclose said outer louvered panel, said inner louvered panel and said wood fiber evaporative cooler pad and are integrally assembled using an adhesive.

12. An integrally assembled disposable cooler pad apparatus for replacement of factory provided cooler pad assemblies on evaporative cooler units, said apparatus comprising:
(a) an outer frame member, said outer frame member being sized to fit in a space provided for said factory provided cooler pad assemblies on said evaporative cooler units, said outer frame member comprising,
(i) a left side and a right side vertical outer retaining flanges,
(ii) an upper horizontal outer retaining flange integrally molded with an upper portion of said left side and right side vertical outer retaining flange,
(iii) a lower horizontal outer retaining flange integrally molded with a lower portion of said left side and right side vertical outer retaining flanges,
(iv) a left side and right side rearwardly protruding flanges integrally molded respectively with said left side and right side vertical outer retaining flanges,
(v) a rearwardly protruding bottom flange integrally molded with said lower horizontal retaining flanges and with said left side and right side rearwardly protruding flanges,
(vi) a rearwardly protruding top flange integrally molded with said upper horizontal outer retaining flange and
(vii) a horizontal support flange integrally molded to said lower horizontal outer retaining flange;
(b) louvered panel means for assembling adjacent said outer frame member, said louvered panel means having a plurality of apertures, said louvered panel means comprising,
(i) an outer louvered panel, said outer louvered panel including a plurality of apertures slanted at 90 degrees with respect to a vertical surface of said outer louvered panel, said outer louvered panel being fabricated from STYROFOAM,
(ii) an inner louvered panel, said inner louvered panel further including a plurality of apertures slanted at negative 45 degrees with respect to a vertical surface of said inner louvered panel, said inner louvered panel being fabricated from STYROFOAM;
(c) a wood fibrous evaporative cooler pad assembled adjacent said louvered panel means;
(d) a water trough, said water trough being assembled to said outer frame member, and being positioned above said louvered panel means and said evaporative cooler pad, said water trough comprising,
(i) a substantially horizontal v-shaped channel and
(ii) water ports integrally formed within said horizontal v-shaped channel;
(e) an inner frame member, said inner frame member being assembled adjacent said evaporative cooler pad, said inner frame member comprising,
(i) a left side and a right side vertical inner retaining flanges,
(ii) an upper horizontal inner retaining flange integrally molded with an upper portion of said left side and right side vertical inner retaining flanges,
(iii) a lower horizontal inner retaining flange integrally molded with said left side and right side vertical inner retaining flanges,
(iv) a left side and a right side outwardly protruding inner side flanges integrally molded respectively with said left side and right side vertical inner retaining flanges, (v) an inner outwardly protruding bottom flange integrally molded with said horizontal inner retaining flange and with said left and right side outwardly protruding inner side flanges and (vi) cross support retaining flanges integrally molded with said left and right side vertical retaining flanges, said lower horizontal inner retaining flange, and with said upper horizontal inner retaining flange, said inner frame member integrally enclosing said evaporative cooler pad, said louvered panel means and said water trough to said outer frame member; and (f) said outer frame member, said inner frame member and said water trough being fabricated from a molded plastic; and said outer frame member, said inner frame member and said water trough enclose said outer louvered panel, said inner louvered panel and said wood fiber evaporative cooler pad and are integrally assembled using an adhesive.

13. A method of providing maintenance on evaporative cooler units requiring periodic maintenance to maintain maximum cooling performance, said method comprising the steps of:

(a) providing an evaporative cooling unit having a set of framed cooler pad assemblies requiring periodic maintenance to maintain maximum cooling performance, said set of framed cooler pad assemblies having calcium deposits, rust, corroded wood fibrous evaporative cooler pad and other undesirable features affecting cooling operation performance;

(b) providing a set of integrally assembled disposable cooler pad apparatus for replacement of said set of framed cooler pad assemblies on said provided evaporative cooler units, said apparatus comprising, (i) an outer frame member, said outer frame member being sized to fit in a space provided for said set of framed cooler pad assemblies on said evaporative cooler units, (ii) at least one louvered panel means for assembling adjacent said outer frame member, said at least one louvered panel means having a plurality of apertures slanted at an angle with respect to a vertical surface of said at least one louvered panel, said at least one louvered panel being fabricated from an expanded synthetic resinous material, (iii) a wood fibrous evaporative cooler pad assembled adjacent said at least one louvered panel means, (iv) a water trough, said water trough being assembled to said outer frame member, and being positioned above said at least one louvered panel means and said evaporative cooler pad and (v) an inner frame member, said inner frame member being assembled adjacent said evaporative cooler pad and provided with means for integrally enclosing said evaporative cooler pad, said at least one louvered panel means and said water trough to said outer frame member;

(c) removing said set of framed cooler pad assemblies from said provided evaporative cooler unit;

(d) disposing of said removed framed cooler pad assemblies; and (e) installing said provided set of integrally assembled disposable cooler pad apparatus in said provided evaporative cooler unit having said removed framed cooler pad assemblies.

* * * * *